(12) United States Patent
Tsuria et al.

(10) Patent No.: US 6,499,103 B1
(45) Date of Patent: Dec. 24, 2002

(54) SYMBOL-DISPLAY SYSTEM

(75) Inventors: Yossef Tsuria, Shoham (IL); Gene Itkis, Maale Adumim (IL); Yaron Sella, Jerusalem (IL); Yishai Sered, Jerusalem (IL)

(73) Assignee: NDS Limited, Middlesex (GB)

( * ) Notice: Subject to any disclaimer, the term of this patent is extended or adjusted under 35 U.S.C. 154(b) by 0 days.

(21) Appl. No.: 09/341,075

(22) PCT Filed: Nov. 2, 1998

(86) PCT No.: PCT/IL98/00530

§ 371 (c)(1),
(2), (4) Date: Oct. 26, 1999

(87) PCT Pub. No.: WO99/27712

PCT Pub. Date: Jun. 3, 1999

(30) Foreign Application Priority Data

Nov. 21, 1997 (IL) .................................................. 122272

(51) Int. Cl.⁷ ................................................ G06F 1/24
(52) U.S. Cl. ........................ 713/153; 713/168; 713/200; 713/201
(58) Field of Search ................................ 713/153, 168, 713/200, 201

(56) References Cited

U.S. PATENT DOCUMENTS

| 3,928,845 | A |   | 12/1975 | Clark ................... 340/324 AD |
| 4,070,693 | A |   | 1/1978  | Shutterly ..................... 358/123 |
| 5,253,067 | A |   | 10/1993 | Chaney et al. ........... 358/191.1 |
| 5,282,249 | A |   | 1/1994  | Cohen et al. .................. 380/23 |
| 5,406,627 | A | * | 4/1995  | Thompson et al. ......... 380/237 |
| 5,425,101 | A | * | 6/1995  | Woo et al. .................. 370/409 |
| 5,481,609 | A |   | 1/1996  | Cohen et al. .................. 380/16 |
| 5,506,904 | A | * | 4/1996  | Sheldrick et al. ........... 380/212 |

FOREIGN PATENT DOCUMENTS

| JP | 57-65974   | 4/1982  | ............. H04N/7/08 |
| WO | WO 96/32702 | 10/1996 | ............. G07F/7/16 |

OTHER PUBLICATIONS

"Functional Model of a Conditional Access System," EBU Review—Technical, No. 266, Dec. 21, 1995, pp. 64–77.
European Standard, "Common Interface Specification for Conditional Access and Other Digital Video Broadcasting Decoder Applications," English Version, Feb. 1997, pp. 1–86.

(List continued on next page.)

Primary Examiner—Thomas R. Peeso
(74) Attorney, Agent, or Firm—Ladas & Parry

(57) ABSTRACT

This invention discloses a symbol-display subscriber unit for use with a broadcast system, the broadcast system including a headend and a network operative to transmit a composite signal from the headend to a multiplicity of subscriber units, the composite sigincluding an encoded broadcast signal encoded in accordance with a plurality of control words (CWs) and a plurality of encryption control messages (ECMs), each of the plurality of ECMs being associated respectively with one of the plurality of CWs and including CW generating information, the multiplicity of subscriber units including at least one said symbol-display subscriber unit, said symbol-display subscriber unit including: a receiver receiving the composite signal from the network, security apparatus in operative engagement with the receiver, the security apparatus receiving each of the plurality of ECMs from the receiver and generating the associated CW from the CW generating information comprised within each said ECM. and a decoder for decoding the encoded broadcast signal for display on a display device, the decoder receiving the encoded broadcast signal from the receiver and receiving the CW from the security apparatus, wherein the security apparatus supplies symbol display information to the decoder, and the decoder provides a symbol to the display device for display thereon, the symbol being based, at least in part, on the symbol display information. A method for producing a symbol is also disclosed.

38 Claims, 9 Drawing Sheets

OTHER PUBLICATIONS

"Digital Video Broadcasting (DVB) ; Support For Use of Scrambling and Conditional Access (CA) Within Digital Broadcasting Systems," European Telecommunications Standards Institute, ETR 289, Oct. 1996, pp. 1–13.

"Guide to the Use of the ATSC Digital Television Standard," Oct. 4, 1995, pp. 1–136.

"DVB Specification for Data Broadcasting," SI–DAT 360, Feb. 12, 1997, pp. 1–22.

Technical Specification of DVB–Simulcrypt, DVB SIM061, Jan. 4, 1997, Part I, PP..

"Response for Data Protection System for Digital Transmission of Copy Protected Information," Copyright—Hitachi, LTD., Matsushita Electric Industrial Co., LTD., Sony Corporation, 1997, Version 0.992, Nov. 8, 1997, pp. 1–41.

* cited by examiner

FIG. 1
PRIOR ART
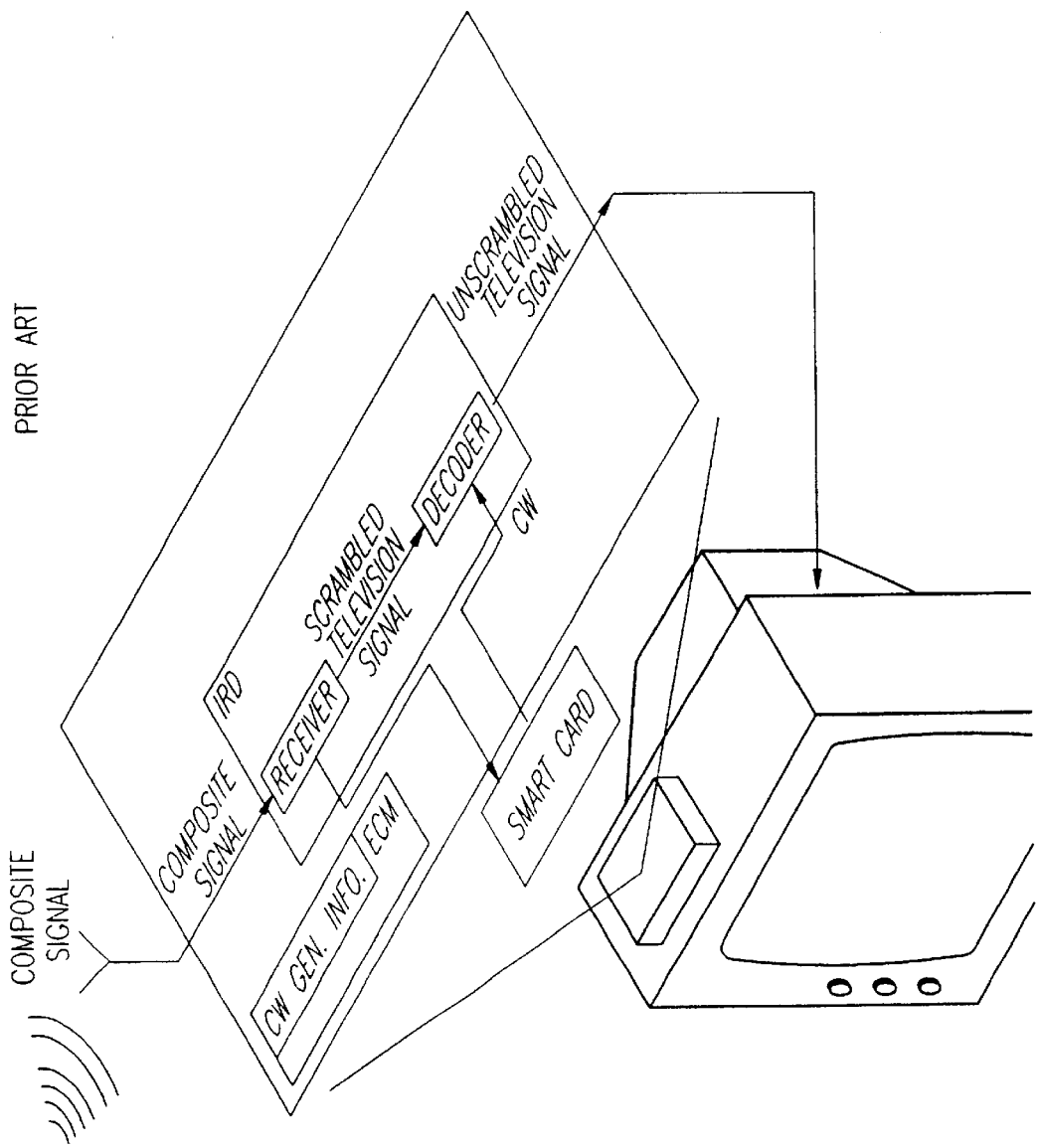
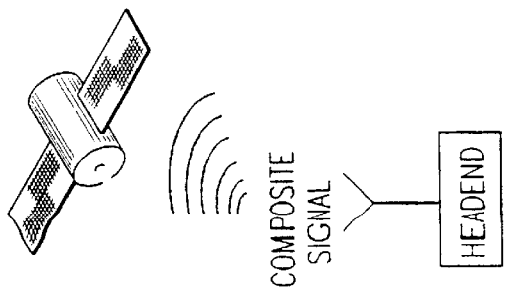

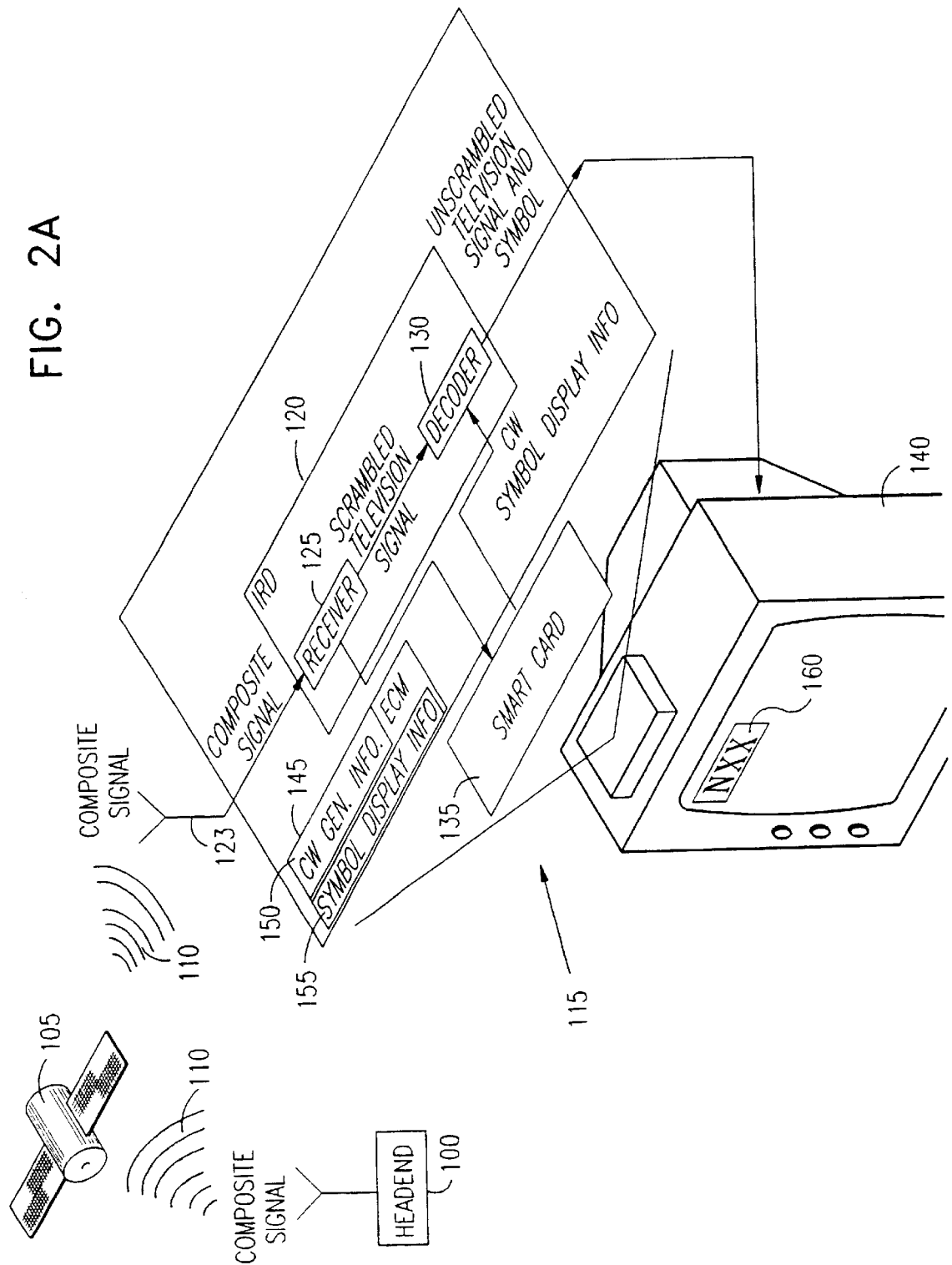

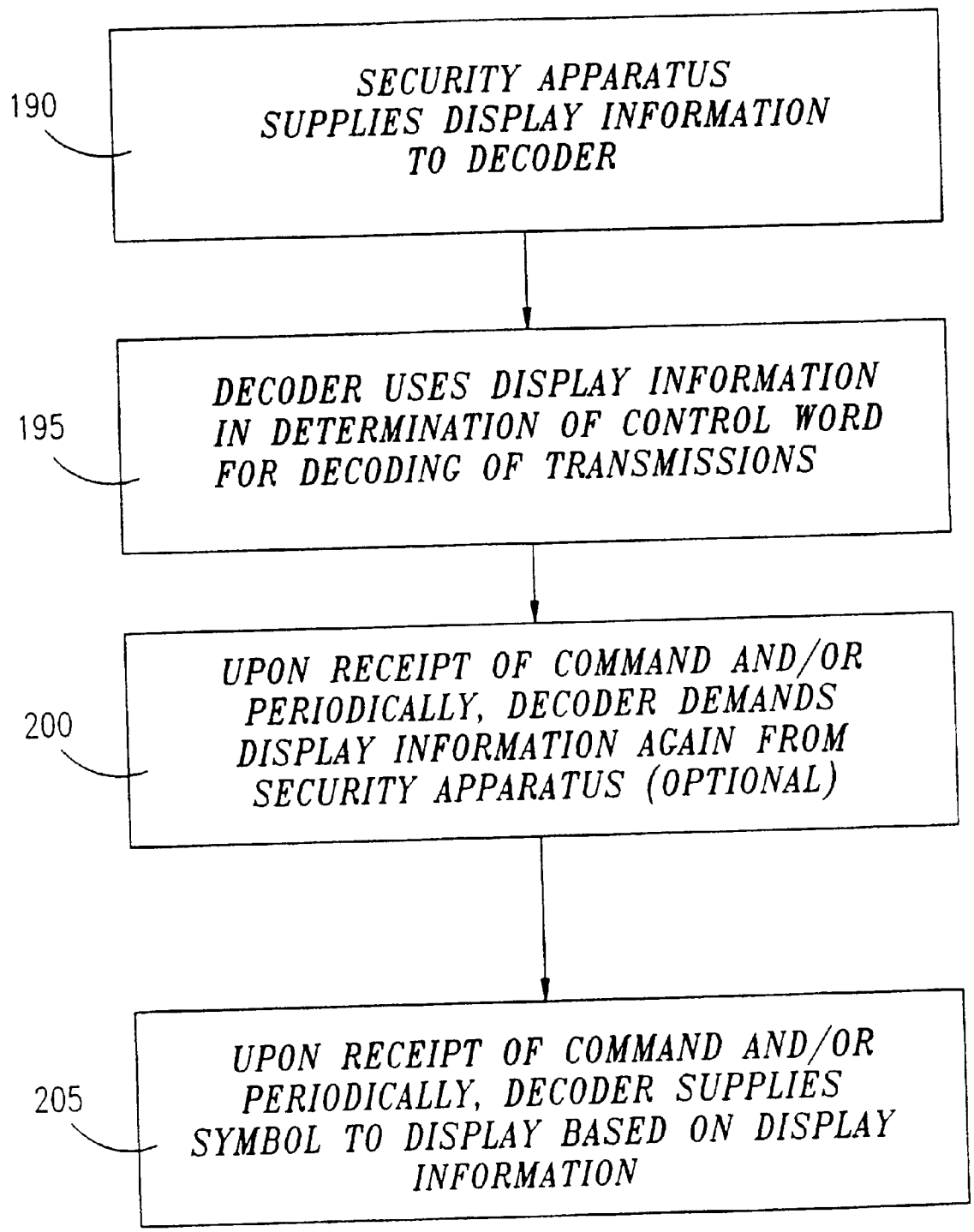

SYMBOL-DISPLAY SYSTEM

FIELD OF THE INVENTION

The present invention relates to apparatus and methods for displaying or making sensible a symbol or a mark, in particular in cases where the symbol or mark is associated with an encoded message.

BACKGROUND OF THE INVENTION

Systems for displaying a symbol on a television display are well known in the art.

U.S. Pat. No. 3,928,845 to Clark describes a character generator system suitable for use in a television broadcast controller.

U.S. Pat. No. 5,253,067 to Chaney et al describes a system to allow a user to select preprogrammed labels for widely used television networks.

Japanese published application 57-65974 describes a character multiplex broadcast TV receiver having a memory for displaying a symbolic pattern representing a concealed display.

Systems for scrambling a television transmission are also well known in the art. The terms "scramble" and "encode", in their various grammatical forms, are used interchangeably throughout the present specification and claims to refer to any method suitable for scrambling or encoding a television transmission. The terms "descramble" and "decode", in their various grammatical forms, are similarly used interchangeably throughout the present specification and claims to refer to any method suitable for rendering a scrambled or encoded television transmission suitable for viewing. Many such methods are known in the art; examples of methods in wide use include "cut-and-rotate", described, for example, in U.S. Pat. No. 4,070,693 to Shutterly, and DES encryption, as described below.

One system for scrambling a television data stream is described in U.S. Pat. Nos. 5,282,249 and 5,481,609, both to Cohen et al. Scrambled television transmissions described in the Cohen et al. patents include both scrambled data representing television signals and coded control messages, also known in the art as ECMs. The ECMs of Cohen et al. include, in a coded form, data necessary for generating a control word (CW) which may be used to descramble the scrambled data representing television signals.

Data necessary for generating a control word is known in the prior art to take many different forms and may include, in general, at least any of the following: a control word; an encrypted control word which is intended to be decrypted before use, and a seed to a generating function such as, for example, a one-way function which generates the control word upon input of the seed. Throughout the present specification and claims the terms "control word generating information" and "CW generating information" are used interchangeably to designate data necessary for generating a control word in any appropriate form, as described above.

While the two patents to Cohen et al. describe an analog system, that is, a system in which analog television data streams are broadcast to television sets, it is appreciated that similar ECM methods may also be used for digital television data streams. Generally, the scrambling techniques used for scrambling analog television signals such as, for example, the well known "cut-and-rotate" technique, are chosen for their applicability to analog signals. In scrambling of digital television signals other scrambling techniques, well-known in the art, are used, the techniques being more appropriate to digital signals such as, for example, applying the well-known DES algorithm to the digital television signals.

A typical prior art system for scrambling and descrambling a television transmission is shown in FIG. 1. In the prior art system of FIG. 1, a removable security element such as a smart card is used to derive a CW from CW generating information included in an ECM and to supply the CW to a decoder for use in descrambling a scrambled television signal.

Methods of transmitting a scrambled digital signal, including ECMs, are well known. The prior art system of FIG. 1 may use a composite signal, that is, an analog or digital signal including more than one component, typically including both a scrambled television signal and ECMs. Prior art references which discuss examples of this type of signal include the following: DVB ETR289, "Digital Video Broadcasting (DVB): Support for use of scrambling and conditional access (CA) within digital broadcasting systems"; and DVB SIM061, "Technical specification of DVB-Simulcrypt", Apr. 1 1997.

Other documents relating to broadcasting of digital information include the DVB Specification for Data Broadcasting, document SI-DAT 360 (TM 1779), Feb. 12 1997; and ATSC Digital Television Standard, document A54, October 1995 and subsequent editions.

Other methods of transmitting a scrambled digital signal, particularly useful in a case where the signal includes sub-signals encoded according to various different methods, are described in "Common Interface Specification for Conditional Access and other Digital Video Broadcasting Decoder Applications", DVB document A017, May 1996 and subsequent editions; and in "Common Interface Specification for Conditional Access and other Digital Video Broadcasting Decoder Applications", CENELEC EN0221:1997.

The disclosures of all references mentioned above and throughout the present specification are hereby incorporated herein by reference.

SUMMARY OF THE INVENTION

The present invention seeks to provide an improved apparatus and methods for displaying or making sensible a symbol or a mark, in particular in cases where the symbol or mark is associated with an encoded message. In a preferred embodiment of the present invention, a symbol or mark is displayed on a display, particularly on a television display. It is appreciated that a mark, such as a trademark, may be sensible to a sense other than vision, and that the present invention is not limited in its applicability to visible marks.

The apparatus and method of the present invention are particularly applicable to encoded data systems, such as encoded data storage systems and encoded data transmission systems. One particularly well-known example of such systems is encoded television systems. Throughout the present specification and claims, encoded television systems are often discussed by way of example, without limiting the generality of the present invention. Other typical applications of the present invention include, but are not limited to the following: other encoded broadcast systems, such as encoded data broadcast systems; and non-broadcast systems, such as systems for playing back a recording, particularly systems for playing back an encoded recording.

In encoded television systems, it may be desirable to cause elements of the system which are responsible for decoding to display a symbol on a television display at a particular time. For example, it may be desirable to display a symbol, such as a trademark, associated with a vendor or with a product or service supplied by a vendor at the time of a sale or offer for sale of a product or service. In the present specification and claims, the terms "symbol", "mark", and "trademark" are used interchangeably to refer to any sensible emblem, token, or sign, particularly of the kinds suitable for use as a trademark.

While the various embodiments of the present invention are generally described below with reference to display of a symbol or mark, it is appreciated that the symbol or mark may be provided as an output and not directly displayed, and the symbol may or may not be further processed, including processing for display, after being produced by the present invention.

It may further be desirable to associate such a symbol with the decoding of encoded television signals in such a way that the decoding equipment is required to supply the symbol for display in order to ensure proper decoding of the encoded signal.

There is thus provided in accordance with a preferred embodiment of the present invention a symbol-display subscriber unit for use with a broadcast system, the broadcast system including a headend and a network operative to transmit a composite signal from the headend to a multiplicity of subscriber units, the composite signal including an encoded broadcast signal encoded in accordance with a plurality of control words (CWs) and a plurality of encryption control messages (ECMs), each of the plurality of ECMs being associated respectively with one of the plurality of CWs and including CW generating information, the multiplicity of subscriber units including the at least one symbol-display subscriber unit, the symbol-display subscriber unit including a receiver receiving the composite signal from the network, security apparatus in operative engagement with the receiver, the security apparatus receiving each of the plurality of ECMs from the receiver and generating the associated CW from the CW generating information included within each the ECM, and a decoder for decoding the encoded broadcast signal for display on a display device, the decoder receiving the encoded broadcast signal from the receiver and receiving the CW from the security apparatus, wherein the security apparatus supplies symbol display information to the decoder, and the decoder provides a symbol to the display device for display thereon, the symbol being based, at least in part, on the symbol display information.

There is also provided in accordance with another preferred embodiment of the present invention a broadcast system including a headend, a network operative to transmit signals from the headend to a multiplicity of subscriber units including at least one symbol-display subscriber unit, the symbol-display subscriber unit including a receiver receiving from the network a composite signal including an encoded broadcast signal encoded in accordance with a plurality of control words (CWs), and a plurality of encryption control messages (ECMs), each of the plurality of ECMs being associated respectively with one of the plurality of CWs and including CW generating information for generating the associated CW, security apparatus in operative engagement with the receiver, the security apparatus receiving each of the plurality of ECMs from the receiver and generating the associated CW from the CW generating information included within the ECM, and a decoder for decoding the encoded signal for display on a display device, the decoder receiving the encoded signal from the receiver and receiving the CW from the security apparatus, wherein the security apparatus supplies symbol display information to the decoder, and the decoder provides a symbol to the display device for display thereon, the symbol being based, at least in part, on the symbol display information.

Further in accordance with a preferred embodiment of the present invention the security apparatus includes removable security apparatus in removable operative engagement with the receiver.

Still further in accordance with a preferred embodiment of the present invention the removable security apparatus includes a smart card.

There is also provided in accordance with another preferred embodiment of the present invention security apparatus for use with a symbol-display subscriber unit of a broadcast system, the broadcast system including a headend and a network operative to transmit signals from the headend to a multiplicity of subscriber units including at least one the symbol-display subscriber unit, the symbol-display subscriber unit including a receiver receiving from the network a composite signal including an encoded broadcast signal encoded in accordance with a plurality of control words (CWs) and a plurality of encryption control messages (ECMs), each of the plurality of ECMs being associated respectively with one of the plurality of CWs and including CW generating information for generating the associated CWs, the security apparatus being operatively engageable with the receiver and with a decoder operative to decode encoded signals using at least one CW and to provide a symbol to a display device based on symbol display information, the security apparatus including a CW generation unit receiving each of the plurality of ECMs from the receiver and generating the associated CW from the CW generating information included within the ECM, and a symbol display information unit for supplying the symbol display information to the decoder.

Further in accordance with a preferred embodiment of the present invention the security apparatus includes a symbol display information storage area for storing the symbol display information.

Still further in accordance with a preferred embodiment of the present invention at least one of the plurality of ECMs includes the symbol display information.

Additionally in accordance with a preferred embodiment of the present invention the CW includes the symbol display information.

Moreover in accordance with a preferred embodiment of the present invention the CW generating information includes a seed to a generating function for generating a CW.

Further in accordance with a preferred embodiment of the present invention the symbol is based, at least in part, on symbol display information included within at least two ECMs.

Still further in accordance with a preferred embodiment of the present invention the symbol display information includes a representation of the symbol.

Additionally in accordance with a preferred embodiment of the present invention the symbol display information includes generating information for generating the symbol.

Moreover in accordance with a preferred embodiment of the present invention at least one of the plurality of ECMs includes control information for controlling display of the symbol.

Further in accordance with a preferred embodiment of the present invention the symbol display information includes symbol display instructions, and the decoder executes the symbol display instructions.

Still further in accordance with a preferred embodiment of the present invention the decoder is operative to decode the encoded broadcast signal based, at least in part, on the symbol display information.

Additionally in accordance with a preferred embodiment of the present invention the symbol includes a trademark.

Moreover in accordance with a preferred embodiment of the present invention the broadcast system includes a television broadcast system, and the network includes a television network, and the encoded broadcast signal includes an encoded television signal.

There is also provided in accordance with another preferred embodiment of the present invention encoded information including symbol display information, wherein the symbol display information includes information for decoding the encoded information.

There is also provided in accordance with another preferred embodiment of the present invention a method for producing a symbol, the method including decoding encoded information based, at least in part, on symbol display information, and producing a symbol based, at least in part, on the symbol display information.

Further in accordance with a preferred embodiment of the present invention the encoded information includes an encoded transmission.

Still further in accordance with a preferred embodiment of the present invention the method also includes displaying the symbol on a display.

Additionally in accordance with a preferred embodiment of the present invention the method includes presenting the symbol on a virtual reality device.

Moreover in accordance with a preferred embodiment of the present invention the method includes presenting the symbol in a manner which is sensible to at least one human sense.

Further in accordance with a preferred embodiment of the present invention the method includes retrieving the symbol display information from a symbol display information storage area.

Still further in accordance with a preferred embodiment of the present invention the method also includes receiving an encryption control message (ECM) including the symbol display information.

There is also provided in accordance with another preferred embodiment of the present invention a method for decoding encoded information, the method including receiving the encoded information, and decoding the encoded information based, at least in part, on symbol display information.

Further in accordance with a preferred embodiment of the present invention the encoded information includes an encoded transmission.

Still further in accordance with a preferred embodiment of the present invention the encoded information includes the symbol display information.

Additionally in accordance with a preferred embodiment of the present invention the method also includes receiving decoding information, wherein the decoding information includes the symbol display information.

There is also provided in accordance with another preferred embodiment of the present invention a method for displaying a symbol on a display within a television system, the method including transmitting an encoded television signal, transmitting a plurality of encryption control messages (ECMs) each including CW generating information for computing a control word (CW) for decrypting the encoded television signal, at least one of the plurality of ECMs also including symbol display information, computing the CW from the CW generating information, and sending the CW and the symbol display information to a decoder.

There is also provided in accordance with another preferred embodiment of the present invention a symbol-display decoding unit for use with encoded information, the encoded information including an encoded information signal encoded in accordance with plurality of control words (CWs) and a plurality of encryption control messages (ECMs), each of the plurality of ECMs being associated respectively with one of the plurality of CWs and including CW generating information, the symbol-display decoding unit including receiving apparatus for receiving the encoded information, security apparatus in operative engagement with the receiving apparatus, the security apparatus receiving each of the plurality of ECMs from the receiving apparatus and generating the associated CW from the CW generating information included within each ECM, and a decoder for decoding the encoded information signal, the decoder receiving the encoded information signal from the receiver and receiving the CW from the security apparatus, wherein the security apparatus supplies symbol display information to the decoder, and the decoder provides a symbol in a format suitable for further processing, the symbol being based, at least in part, on the symbol display information.

Further in accordance with a preferred embodiment of the present invention the symbol-display decoding unit also includes data playback apparatus for supplying the encoded information to the receiving apparatus.

Still further in accordance with a preferred embodiment of the present invention the symbol-display decoding unit also includes virtual reality apparatus for receiving the symbol from the decoder and for providing a virtual reality display of the symbol.

Additionally in accordance with a preferred embodiment of the present invention the security apparatus is adapted to receive at least one conditional access (CA) module, the at least one CA module being operative to receive each of the plurality of ECMs from the security apparatus, generate the associated CW from the CW generating information included within each the ECM, and supply the symbol display information to the security apparatus.

Moreover in accordance with a preferred embodiment of the present invention the at least one CA module includes a plurality of CA modules.

Further in accordance with a preferred embodiment of the present invention only one of the plurality of CA modules provides the symbol display information for each of the plurality of ECMs.

Still farther in accordance with a preferred embodiment of the present invention more than one of the plurality of CA modules provides the symbol display information for at least one of the plurality of ECMs.

There is also provided in accordance with another preferred embodiment of the present invention a symbol-display decoding method for use with encoded information, the encoded information including an encoded information signal encoded in accordance with plurality of control words (CWs) and a plurality of encryption control messages (ECMs), each of the plurality of ECMs being associated respectively with one of the plurality of CWs and including CW generating information, the method including receiving the encoded information, receiving each of the plurality of ECMs and generating the associated CW from the CW generating information included within each ECM, and decoding the encoded information signal, the decoding step including receiving the encoded information signal from the receiver, and receiving the CW from the security apparatus, and supplying symbol display information for providing a symbol in a format suitable for further processing, the symbol being based, at least in part, on the symbol display information.

BRIEF DESCRIPTION OF THE DRAWINGS

The present invention will be understood and appreciated more fully from the following detailed description, taken in conjunction with the drawings in which:

FIG. 1 is a simplified partly pictorial, partly block diagram illustration of a prior art encoded television system;

FIG. 2A is a simplified partly pictorial, partly block diagram illustration of a symbol display encoded television system constructed and operative in accordance with a preferred embodiment of the present invention;

FIG. 4 is a simplified flowchart illustration of a preferred method of operation of the systems of FIGS. 2A and 2B;

DETAILED DESCRIPTION OF A PREFERRED EMBODIMENT

Figure 2B:
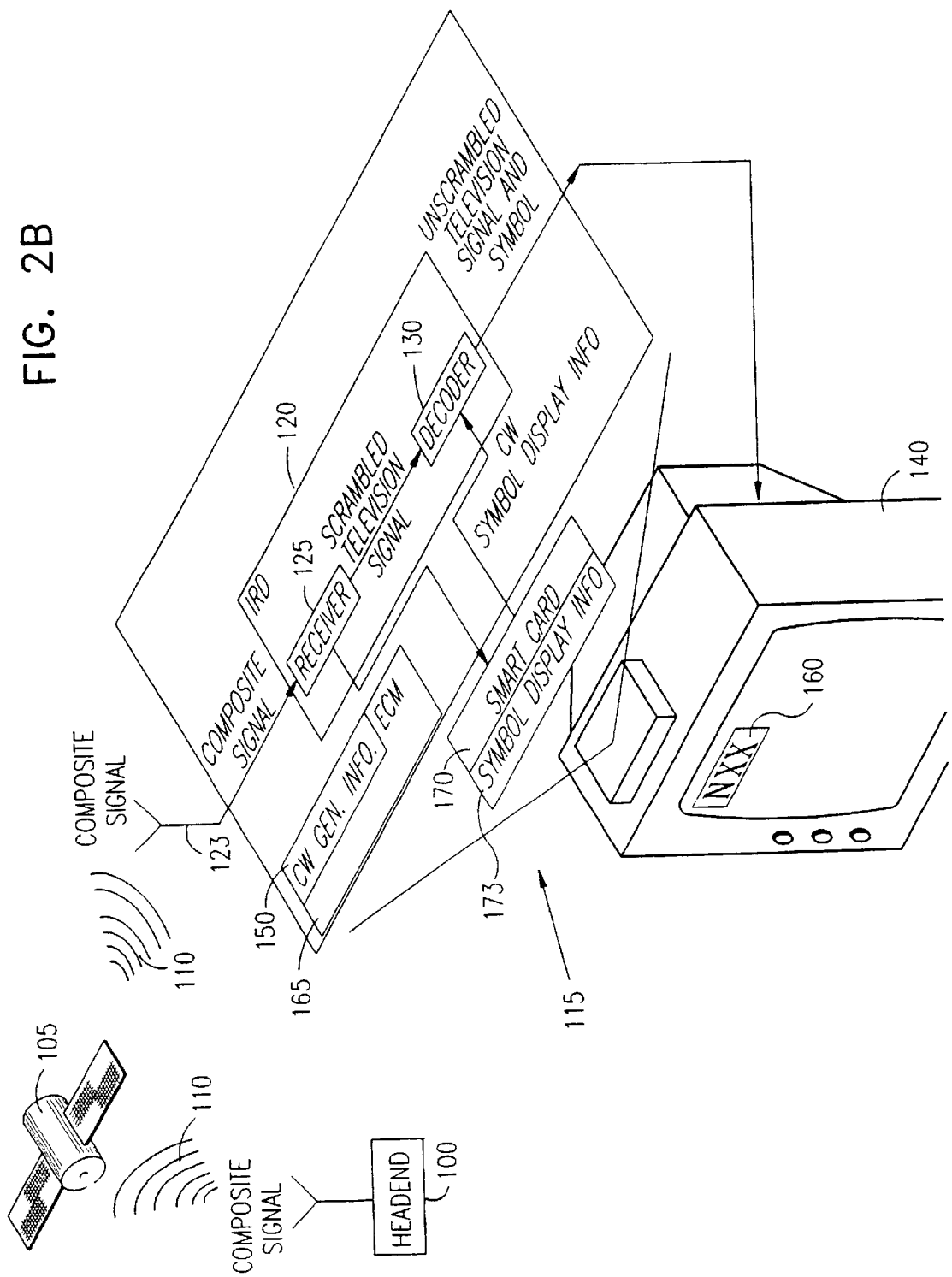
FIG. 2B is a simplified partly pictorial, partly block diagram illustration of a symbol display encoded television system constructed and operative in accordance with an alternative preferred embodiment of the present invention.

Reference is now made to FIG. 2A which is a simplified partly pictorial, partly block diagram illustration of a symbol display encoded television system constructed and operative in accordance with a preferred embodiment of the present invention. As explained above, it is understood that the present invention is not limited to a television system, but may be applicable to any broadcast system including a data broadcast system, or a data playback or retrieval system of any kind. It is also appreciated that the present invention may be used in a context in which data is displayed on a display or otherwise rendered available for access by a user such as, for example, by printing, by presentation with a virtual reality device, by any other kind of sensory input device, by storage on any appropriate storage medium for later access, etc. The specific example of a television system is used to simplify the description of the present invention, and is not intended to limit the generality of the foregoing.

The system of FIG. 2A preferably comprises a headend 100, which may be similar to conventional headend systems which are well known in the art. The system of FIG. 2A also typically comprises a broadcast medium such as a satellite 105. It is appreciated that any appropriate broadcast medium, such as, for example, cable or terrestrial broadcast media, including digital or analog broadcast media, may be used instead of the satellite 105.

The headend 100 typically broadcasts a composite signal 110 via the broadcast medium such as the satellite 105, the composite signal 110 typically comprising at least a scrambled television signal and associated ECMs, as described below. As described below in more detail with reference to FIG. 5, it is appreciated that the scrambled signal and the associated ECMs may be provided separately rather than as components of a composite signal.

The system of FIG. 2A also preferably comprises a subscriber unit 115. Typically, a multiplicity of subscriber units 115 is provided, only one subscriber unit 115 being shown in FIG. 2A in order to simplify the description of the present invention. It is appreciated that, in practice, up to a large number of subscriber units, such as millions of subscriber units, may be used.

The subscriber unit 115 typically comprises an IRD (integrated receiver decoder) 120 which may be similar to IRD units which are well known in the art, except as described below. The IRD 120 typically receives the composite signal 110 via an antenna 123 and associated cabling, or by any other appropriate means.

The IRD 120 typically comprises a receiver 125 and a decoder 130, each of which may be implemented in software and hardware by conventional means. The receiver 125 is operatively associated with the decoder 130, typically being operative to tune the received composite signal 110, to separate components of the composite signal 110, and to send a scrambled television signal comprised in the composite signal 110 to the decoder 130.

The subscriber unit 115 also typically comprises a removable security element such as a smart card 135. The smart card 135 may be generally similar to removable security elements well-known in the art, such as in the prior art system of FIG. 1, except as described below. Typical functions performed by a prior art smart card are described in U.S. Pat. Nos. 5,282,249 and 5,481,609, both to Cohen et al., referred to above.

The receiver 125 is also typically operative to send ECMs comprised in the received composite signal 110 to the smart card 135. The smart card 135 typically receives the ECMs from the receiver 125 and supplies information, as described below, to the decoder 130.

While a removable security element such as the smart card 135 is typically used and is generally described throughout the present specification and claims, it is appreciated that a non-removable security element, such as a security element comprised within the IRD 120, may also be used. In such a case, the non-removable security element would preferably function similarly to a removable security element, except for being non-removable.

The subscriber unit 115 also typically comprises a display 140, operatively attached to the decoder 130 and receiving suitable display signals therefrom. The display 140 may be any suitable display, such as a conventional television apparatus. It is appreciated that the display 140 and the display signals sent by the decoder 130 are chosen so as to be compatible, typically in conformance to a standard, as is well known in the art.

The operation of the apparatus of FIG. 2A is now briefly described. The receiver 125 separates the incoming composite signal 110 into a plurality of components, typically comprising at least a scrambled television signal and a plurality of ECMs, one ECM 145 being shown in FIG. 2A. As described above, it is conventional in scrambled television systems for a plurality of ECMs to each comprise CW generating information for generating a CW. The smart card 135 is typically operative to generate the CW from the CW generating information 150 and supply the CW to the decoder 130 for decoding a segment of the scrambled television signal which is associated with and may be descramble using the CW. Typically, the CW changes frequently such as, for example, every few seconds, and thus a new segment of scrambled television signal, which may be descramble with a new CW, is broadcast every few seconds along with an associated ECM as previously described.

In the embodiment of FIG. 2A the ECM 145 preferably also comprises symbol display information 155 for generating a symbol 160 for display on the display 140. It is appreciated that the symbol 160 may take any appropriate form, including, for example: one or more characters; a picture; an animated picture; an icon; a trademark; or any combination of the above.

It is also appreciated that the symbol display information 155 may take any appropriate form including, for example: a bitmap of the symbol 160; a compressed bitmap of the symbol 160; generating information that may be used by the decoder 130 to generate the symbol 160; one or more programmed instructions that may be used by the decoder 130 to generate the symbol 160; an address of the symbol 160 within a memory (not shown) of the decoder 130; an indication for choosing a symbol from a plurality of symbols associated with the decoder 130 and typically stored therein; a character-based representation of the symbol 160, such as, for example, an ASCII representation; a font-based representation of the symbol 160, such as, for example, an indication as to which character or characters in a font may be used to generate the symbol 160; an animation-based representation of the symbol 160; a description of the symbol 160 in a graphic description language; any other appropriate representation of the symbol 160; an indication to utilize a specific component of the composite signal 100 for producing the symbol 160; any other appropriate means; or any appropriate combination of the above.

It is also appreciated that, although the symbol display information 155 is shown as separate from the CW generating information 150, the symbol display information 155 may alternatively be comprised in the CW generating information 150. In such a case, a portion of the CW generating information 150 typically serves not only as CW generating information but also as the symbol display information 155. Which portion of the CW generating information 150 serves as the symbol display information 155 may be predetermined, may be determined according to information comprised within the ECM 145, or may be determined by other suitable means.

It is further appreciated that the amount of symbol display information 155 necessary to generate the symbol 160 may be greater than a maximum amount of information that can be accommodated within one ECM 145, particularly in a typical case where the ECM 145 has a fixed size and other information, such as the CW generating information 150, is also comprised within the ECM 145. In such a case, it is appreciated that the symbol generating information 155 from a plurality of ECMs 145 may be combined together, either within the smart card 135 or, typically, within the decoder 130, in order to form the full symbol generating information necessary to generate the symbol 160. It is appreciated that many methods of sending a message in segments and assembling the segments together into the full message are well known in the art, and that any appropriate such method may be used to combine symbol display information 155 from a plurality of ECMs 145.

It is also appreciated that the symbol display information 155, or another portion of the ECM 145, may include control information controlling the display of the symbol 160 on the display 140. Such control information may include, for example, one or more of the following: an instruction to begin displaying the symbol 160; an instruction to cease displaying the symbol 160; an instruction to place the symbol 160 at a particular location on the display 140; an instruction to animate the symbol 160; an instruction to cease animating the symbol 160; or any other appropriate control instruction. Typically, the decoder 130 is operative to act on the control information when the control information is received by the decoder 130.

It may be desirable to verify that the symbol display information provided by the smart card 135 is identical to the symbol display information 155 that was contained in the ECM 145, or to symbol display information known to the headend 100 but not transmitted. In such a case, the decoder 130 may perform any appropriate operation using the CW and the symbol display information provided by the smart card 135 in order to produce a final version of the CW for use in decoding the scrambled television transmission, the scrambled television signal having been scrambled for decoding with the final version of the CW. By way of example only and without limiting the generality of the foregoing, the decoder 130 may concatenate the CW and the symbol display information in order to produce a final version of the CW. It is appreciated that other appropriate operations may be used to produce the final version of the CW.

It is appreciated that performing an operation combining the CW and the symbol display information, as described above, ensures that the smart card 135 provides the correct symbol display information; otherwise, the scrambled television signal will not be correctly descramble because the final version of the CW will be incorrect. It is also appreciated that, in a case where the symbol 160 comprises a trademark, it may be preferable to ensure that the trademark symbol is correctly supplied by the smart card 135, and in such a case verification of the symbol display information provided by the smart card 135 is preferred.

Reference is now made to FIG. 2B, which is a simplified partly pictorial, partly block diagram illustration of a symbol display encoded television system constructed and operative in accordance with an alternative preferred embodiment of the present invention. The system of FIG. 2B is similar to the system of FIG. 2A, except as described below.

The system of FIG. 2B comprises an ECM 165, which in turn comprises the CW generating information 150. The ECM 165 need not comprise the symbol display information 155 which is comprised in the ECM 145 of FIG. 2A. The system of FIG. 2B also comprises a smart card 170, which may be similar in structure and function to the smart card 135 of FIG. 2A, except that the smart card 170 of FIG. 2B comprises symbol display information 173, which may be similar to the symbol display information 155 of FIG. 2A but which is typically stored within the smart card 170 in any appropriate manner, as is well-known in the art for storing data within a smart card.

The operation of the system of FIG. 2B is similar to the operation of the system of FIG. 2A, except that the symbol display information 155 is stored in the smart card 170 and is typically provided to the decoder 130 for display based on control information, as described above with reference to FIG. 2A.

Figure 3A:
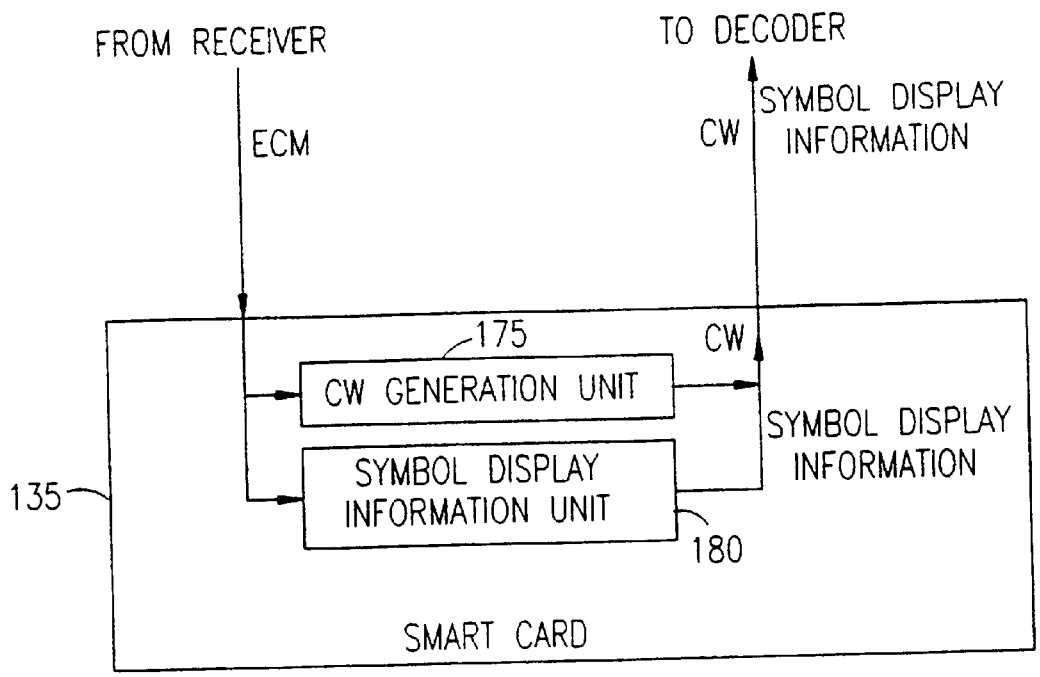
FIG. 3A is a simplified block diagram illustration of a preferred embodiment of the smart card of FIG. 2A.

Reference is now made to FIG. 3A, which is a simplified block diagram illustration of a preferred embodiment of the smart card 135 of FIG. 2A. The smart card 135 typically comprises a CW generation unit 175 and a symbol display information unit 180, each of which is typically implemented in software and hardware, as is well-known in the art. The CW generation unit 175 is preferably operative, as described above with reference to FIG. 2A, to produce a CW from received CW generating information comprised in an ECM. The symbol display information unit 175 is typically operative, as described above with reference to FIG. 2A, to produce symbol display information from symbol display information comprised in the ECM.

Typically, the CW generation unit 175 may receive the entire ECM and forward the symbol display information to the symbol display information unit 180, particularly in a case where the symbol display information is comprised in the ECM. Alternatively, both the CW generation unit 175 and the symbol display information unit 180 may receive the entire ECM and each preferably operates only on a relevant portion of the ECM. Further alternatively, a combination of both methods may be used. Still further alternatively, the CW generation unit 175 and the symbol display information unit 180 may be combined in a single unit.

Figure 3B:
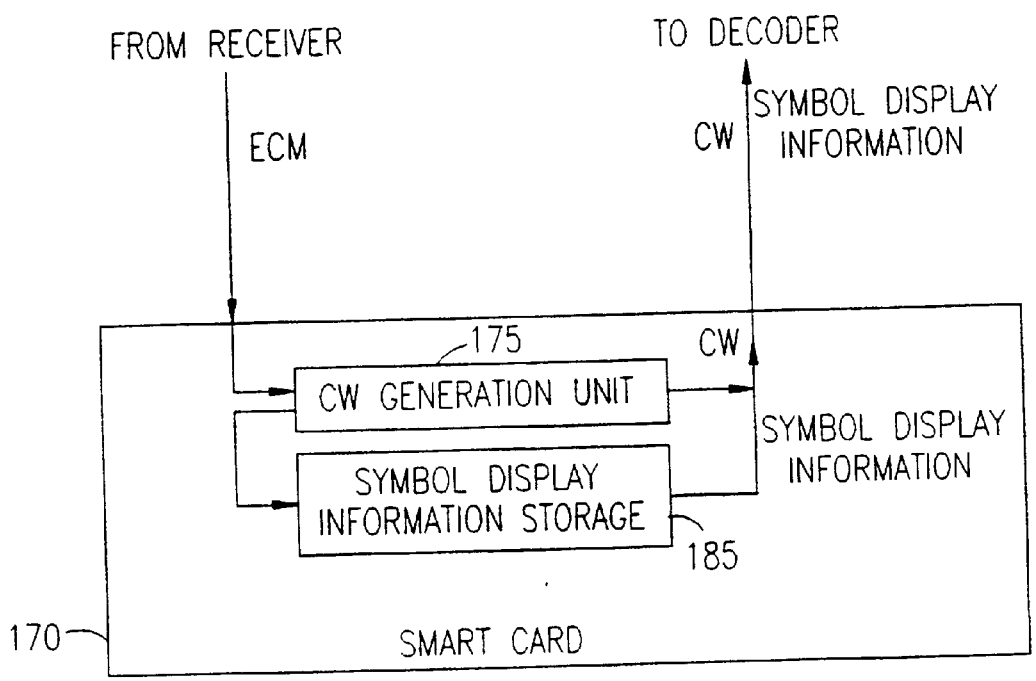
FIG. 3B is a simplified block diagram illustration of a preferred embodiment of the smart card of FIG. 2B.

Reference is now made to FIG. 3B, which is a simplified block diagram illustration of a preferred embodiment of the smart card 170 of FIG. 2B. The structure and operation of the smart card 170 is similar to that of the smart card 135 of FIG. 3A, except that, in place of the symbol display information unit 180 of FIG. 3A the smart card 170 comprises a symbol display information storage unit 185. The symbol display information storage unit 185 typically comprises a suitable memory device, such as a ROM or an EE-PROM as are well known in the art. The symbol display information storage unit 185 is typically operative to store symbol display information and to supply the symbol display information on command, typically on command received from the CW generation unit 175 or otherwise.

The information stored in the symbol display storage information unit 185 may be stored at the time of manufacture of the smart card 170; may be written into the symbol display storage information unit 185 at the time of personalization of the smart card 170 for a particular customer; may be broadcast over the air to the smart card 170; may be chained from data comprised in a previously-used smart card, as is well known in the art in a case where smart cards are periodically changed; may be stored in the IRD 120 or in a removable conditional access module (not shown in FIG. 3B) or may be provided for storage by any other appropriate method.

Reference is now made to FIG. 4, which is a simplified flowchart illustration of a preferred method of operation of the systems of FIGS. 2A and 2B. The method of FIG. 4 preferably comprises the following steps:

Security apparatus, typically comprising removable security apparatus such as a smart card, supplies display information to a decoder, such as a decoder in a scrambled television system (step 190). Preferably, the decoder uses the display information, typically as part of a process for determining a control word used to decode scrambled transmissions (step 195).

Optionally, the decoder demands display information again from the removable security apparatus; typically the information is demanded upon receipt of a broadcast command, periodically, or randomly (step 200). In a case where the display information is intended to display a trademark at the time that goods and/or services are sold or offered for sale, including step 200 in the method of FIG. 4 is preferred.

Preferably, as part of step 200, the decoder may compare the display information received in step 200 with the display information supplied by the removable security apparatus in step 190, and may refuse to continue to operate if the display information received in step 200 does not match the display information received in step 190. In this way, since the display information supplied in step 190 is essential in determining a control word in step 195, the decoder may ensure that the display information provided for display in step 200 matches specific, predetermined display information used in step 195.

The decoder supplies a symbol, based on the display information, to a display; the symbol is typically provided periodically and/or upon receipt of a broadcast command (step 205).

Figure 5:
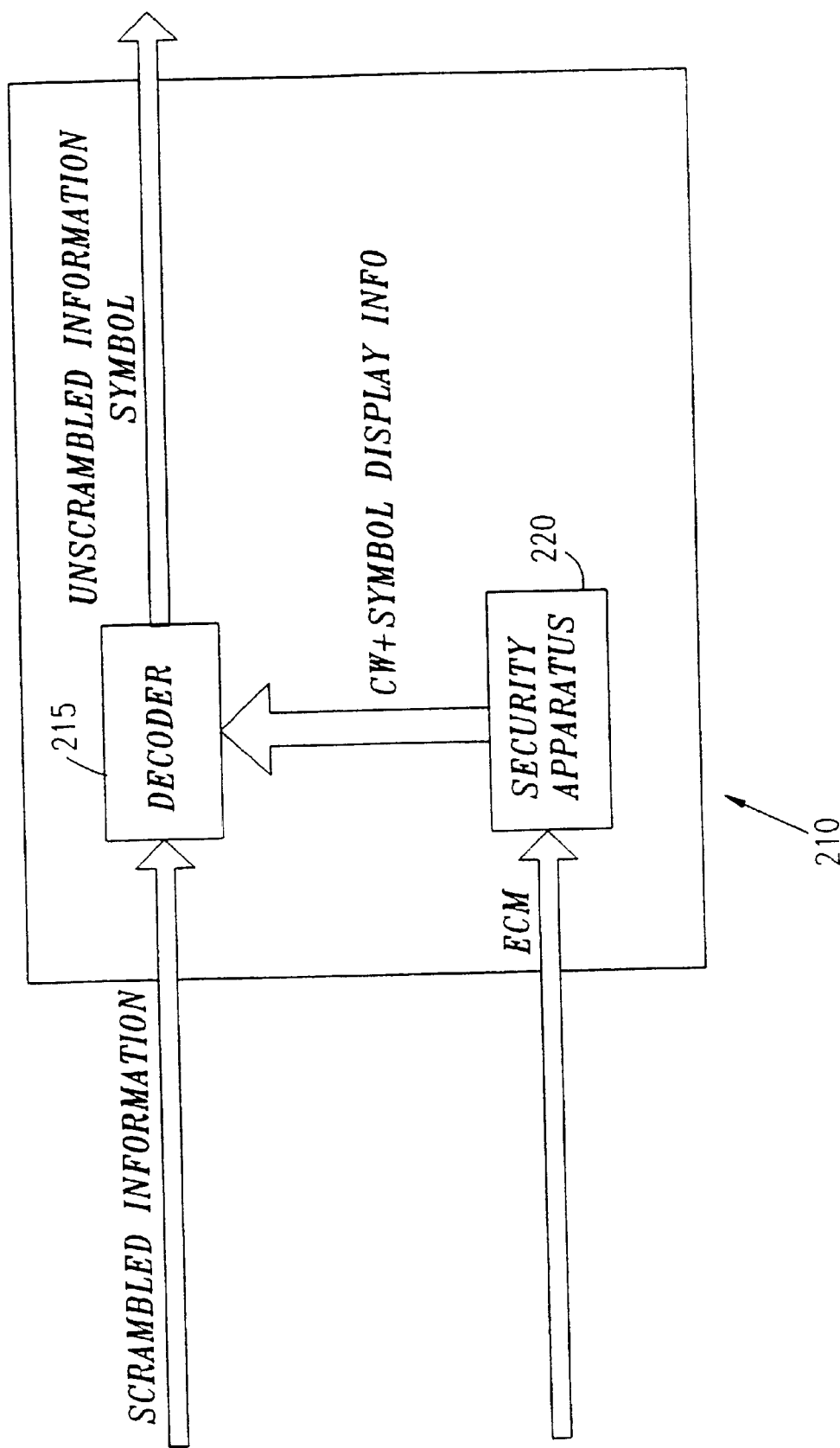
FIG. 5 is a simplified partly pictorial, partly block diagram illustration of a symbol display encoded information system constructed and operative in accordance with an alternative preferred embodiment of the present invention.

Reference is now made to FIG. 5, which is a simplified partly pictorial, partly block diagram illustration of a symbol display encoded information system constructed and operative in accordance with an alternative preferred embodiment of the present invention. The apparatus of FIG. 5 comprises a decoding and symbol generation unit (DSGU) 210.

The DSGU 210 preferably comprises a decoder 215, which may be similar in structure and function to the decoder 130 of FIGS. 2A and 2B, described above. The DSGU 210 also preferably comprises security apparatus 220, which may be similar in structure and function to the smart card 135 of FIG. 2A or, alternatively, to the smart card 170 of FIG. 2B. As in other embodiments of the present invention, it is appreciated that the security apparatus 220 may comprise any appropriate security apparatus, removable or non-removable.

The operation of the apparatus of FIG. 5 is now briefly described. The decoder 215 typically receives a scrambled information signal from a source external to the DSGU 210. The scrambled information signal may or may not be a television signal and may be broadcast or may be supplied by other suitable means well known in the art, including via any suitable network or via a wired connection.

The security apparatus 220 typically receives an ECM, which may be similar to the ECM 145 of FIG. 2A or to the ECM 165 of FIG. 2B. The ECM may be broadcast or may be supplied by other suitable means well-known in the art. The ECM may originate from the same source as the scrambled information, or may originate from another source.

The security apparatus 220 is typically operative to produce a CW and symbol display information and to provide the CW and the symbol display information to the decoder 215. The CW and the symbol display information may be as described above with reference to FIGS. 2A and 2B and may be produced in a manner similar to that described above with reference to FIGS. 2A and/or 2B.

The decoder 215 is preferable operative to process the scrambled information and the CW and the symbol display information in a manner similar to that described above with reference to the decoder 130 of FIGS. 2A and 2B and to output unscrambled information and a symbol.

More generally, it is appreciated that a wide variety of methods may be used to associate symbol display information with scrambled information. For example and without limiting the generality of the foregoing, the scrambled information may be scrambled in the sense that it is delivered in a format not generally known, and the scrambled information includes therein symbol display information which is also used to convert the format of the scrambled information to a generally accepted format for further processing or display.

Figure 6:
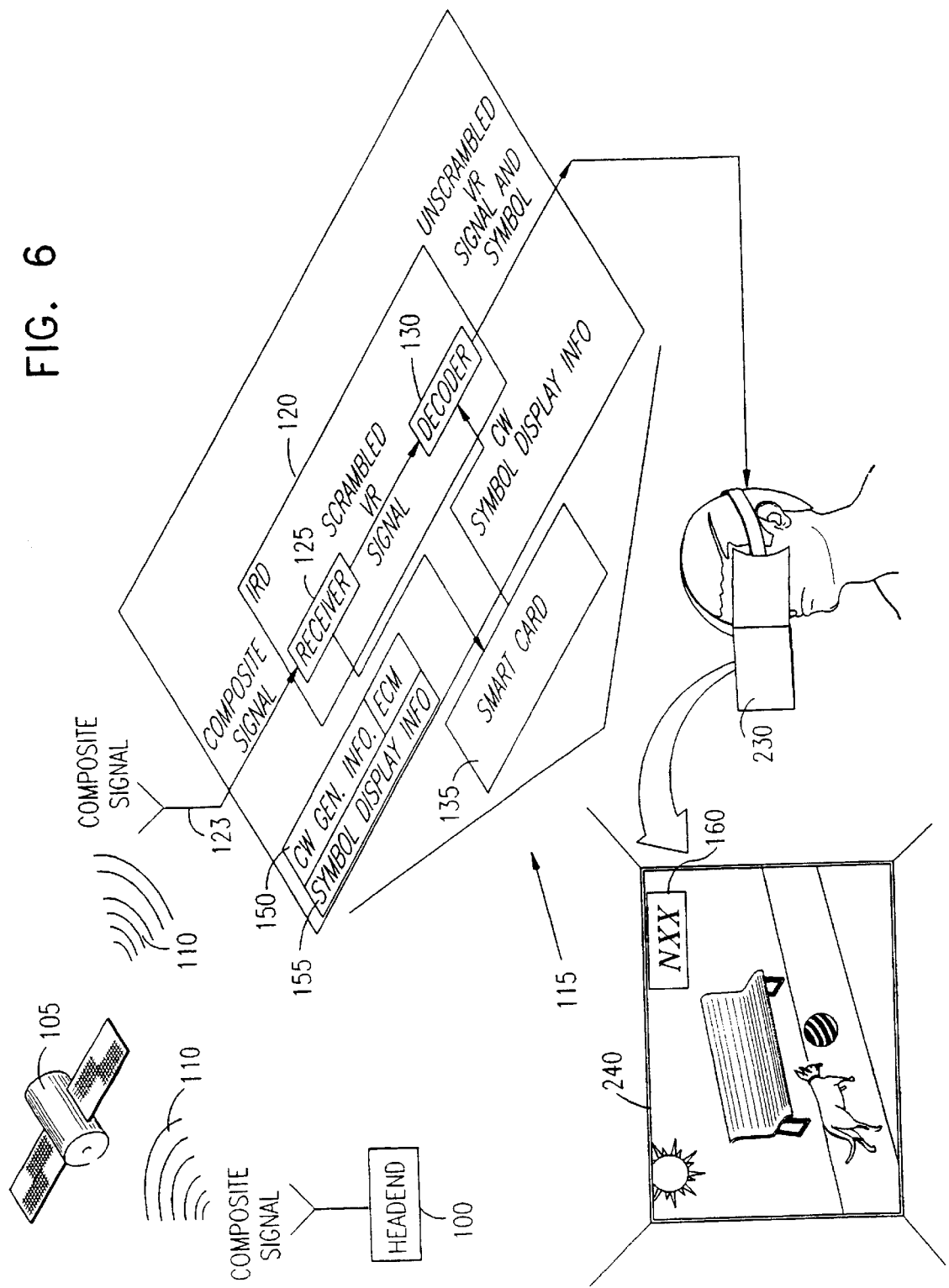
FIG. 6 is a simplified partly pictorial, partly block diagram illustration of a symbol display encoded virtual reality system constructed and operative in accordance with another alternative preferred embodiment of the present invention.

Reference is now made to FIG. 6, which is a simplified partly pictorial, partly block diagram illustration of a symbol display encoded virtual reality system constructed and operative in accordance with another alternative preferred embodiment of the present invention. The system of FIG. 6 is similar to the systems of FIGS. 2A and 2B, except that a scrambled virtual reality signal is supplied and descramble, the descramble virtual reality signal and symbol display information being then supplied to virtual reality apparatus 230, which may comprise any appropriate virtual reality apparatus well-known in the art. The symbol 160 is seen as incorporated into a virtual reality scene 240.

It is appreciated that, in a more general sense, a signal may be made sensible to any of the senses, such as the sense of smell, with a symbol then comprising a particular smell, for example, so that the present invention is not limited to particular implementations of virtual reality.

Figure 7:
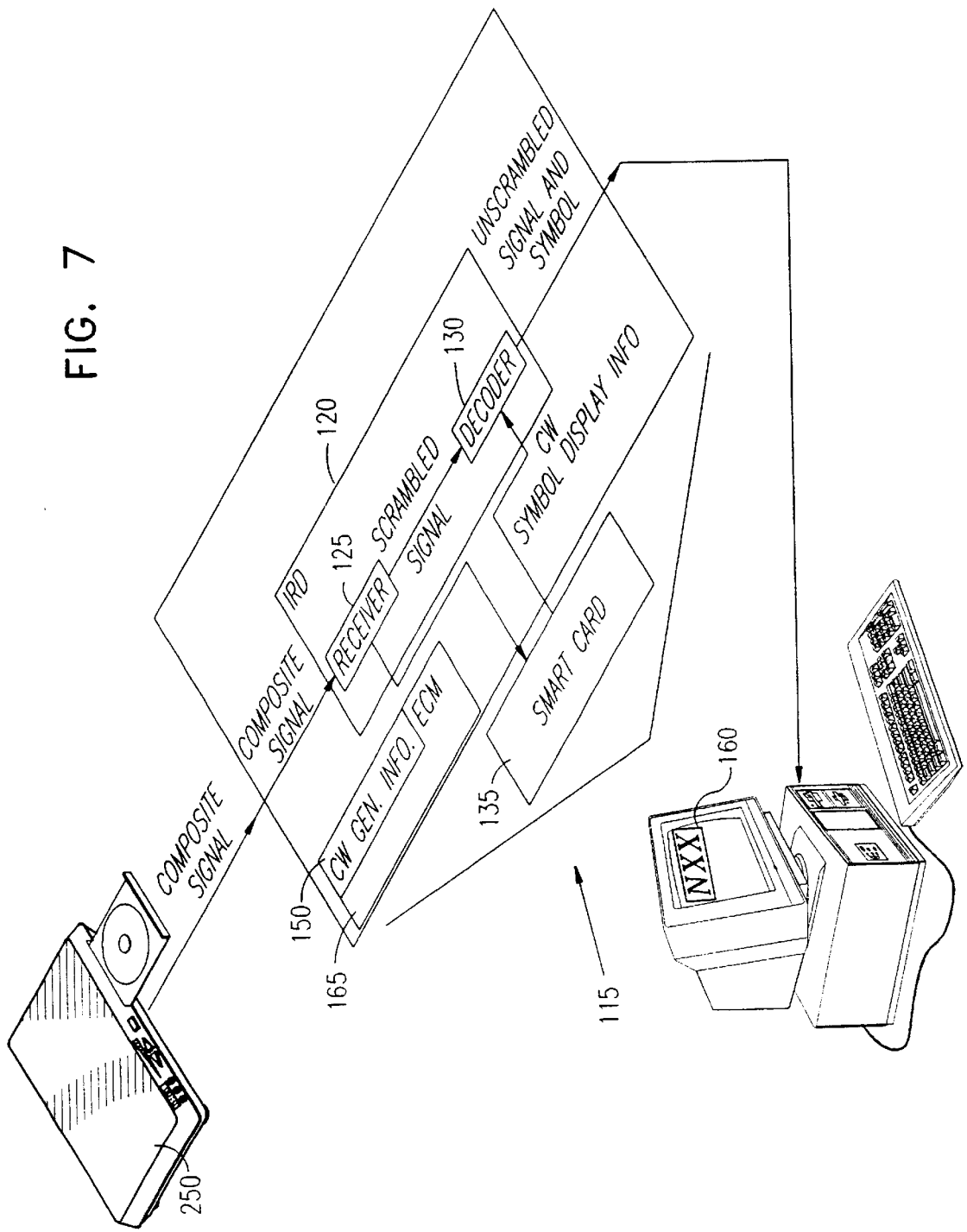
FIG. 7 is a simplified partly pictorial, partly block diagram illustration of a symbol display encoded playback system constructed and operative in accordance with still another preferred embodiment of the present invention.

Reference is now made to FIG. 7, which is a simplified partly pictorial, partly block diagram illustration of a symbol display encoded playback system constructed and operative in accordance with still another preferred embodiment of the present invention. The system of FIG. 7 is similar to the systems of FIGS. 2A and 2B except that the broadcast source, the headend 100 of FIG. 2A, is replaced with a playback device 250, which may be any suitable playback device such as, for example, a digital video disk (DVD playback device).

It is appreciated that the principles and apparatus described above with reference to FIGS. 2A and 2B are also applicable to the systems of FIGS. 6 and 7. It is further appreciated that the various output devices shown in FIGS. 2A, 2B, 6, and 7 are shown by way of example only, and any other output device such as, for example, a suitable recording device, may also be used.

Figure 8:
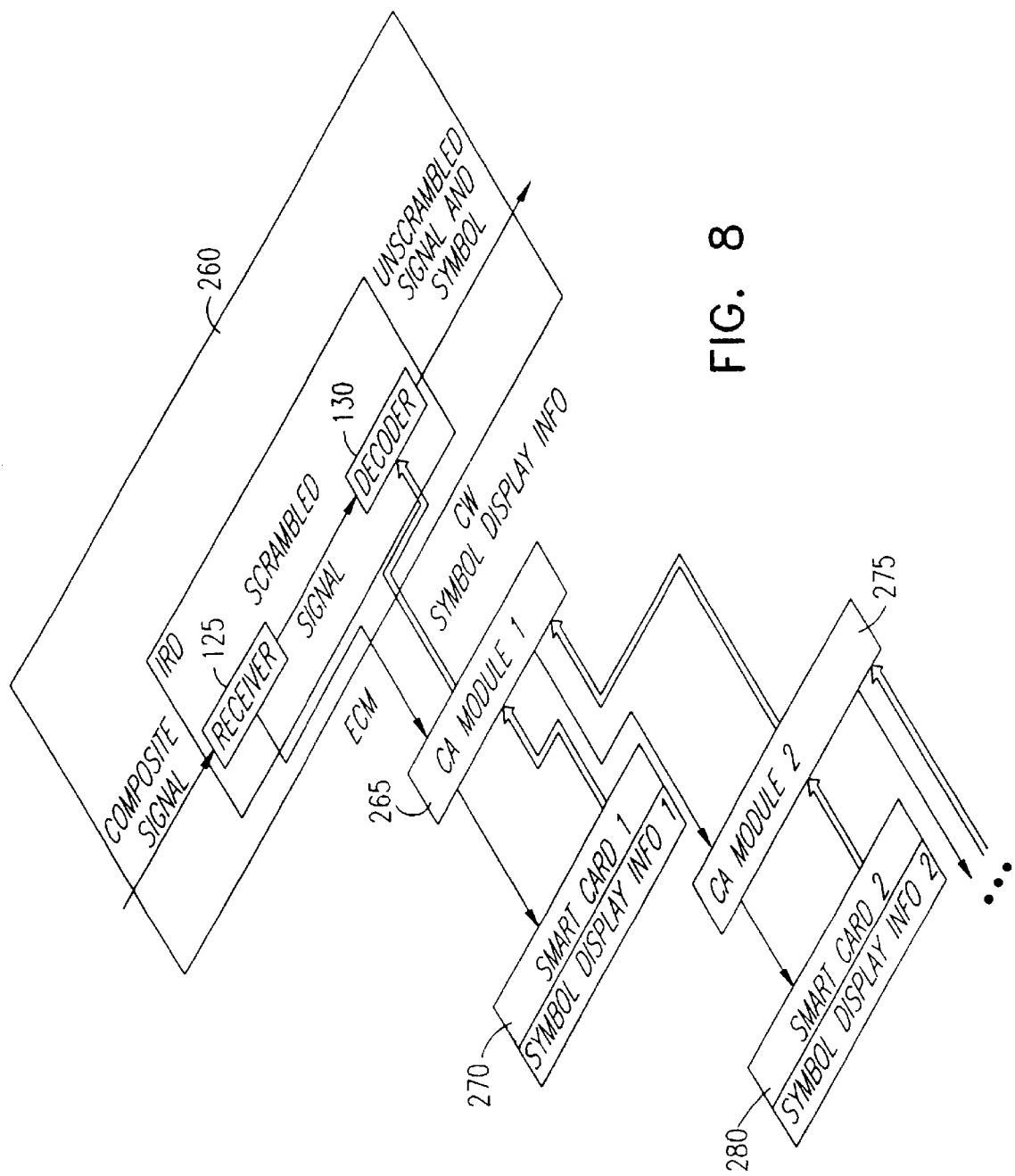
FIG. 8 is a simplified partly pictorial, partly block diagram illustration of a symbol display encoded television system constructed and operative in accordance with yet another preferred embodiment of the present invention.

Reference is now made to FIG. 8, which is a simplified partly pictorial, partly block diagram illustration of a symbol display encoded television system constructed and operative in accordance with yet another preferred embodiment of the present invention. The embodiment of FIG. 8 is suitable to a common interface system.

In a common interface system, as is well-known in the art, a plurality of encoded inputs from different providers are typically combined together into a composite signal, each encoded input typically requiring a method different from the other coded inputs for producing a CW from an ECM. In prior art common interface systems, as described, for example in "Common Interface Specification for Conditional Access and other Digital Video Broadcasting Decoder Applications", referred to above, the problem of applying the correct method to each ECM is solved by providing one or more removable CA modules which are typically connected to an IRD in a chained manner, with a first CA module being connected to the IRD and subsequent CA modules being connected to the previous CA module. Each CA module is then operative to translate the appropriate ECMs belonging to a corresponding coded input.

It is appreciated that the description of the CA modules as being "chained", and the depiction thereof in FIG. 8, are meant to describe the logical data flow between CA modules and that various methods of physical connection, including methods described in "Common Interface Specification for Conditional Access and other Digital Video Broadcasting Decoder Applications", referred to above, may be used. The current description is not meant to be limited to any particular method of physical connection.

The apparatus of FIG. 8 comprises an IRD 260, which in turn comprises a receiver 125 and a decoder 130 which may be similar to those of FIG. 2A. The IRD 260 is adapted to receive a first CA module 265 which may be similar to common interface CA modules known in the art. The first CA module 265 is typically in removable operative attachment with a first smart card 270, which may be similar to the smart card 150 of FIG. 2A and which similarly comprises symbol display information 155.

A second CA module 275 and second smart card 280, similar in structure and function to the first CA module 265 and the first smart card 270 are also shown in FIG. 8, it being understood that, alternatively, either one CA module or a plurality of CA modules may be provided.

The operation of the system of FIG. 8 may be similar to the operation of the systems of FIGS. 2A and 2B, with the one of the CA modules 265 or 275, and associated smart card 270 or 280, which produces the CW also producing the symbol display information. It is appreciated that alternative modes of operation may also be possible, with more than one CA module producing symbol display information, including more than one CA module producing symbol display information for one ECM, or with one CA module producing the CW and another producing the symbol display information.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A symbol-display subscriber unit for use with a broadcast system, the broadcast system comprising a headend and a network operative to transmit a composite signal from the headend to a multiplicity of subscriber units, the composite signal comprising an encoded broadcast signal encoded in accordance with a plurality of control words (CWs) and a plurality of encryption control messages (ECMs), each of the plurality of ECMs being associated respectively with one of the plurality of CWs and comprising CW generating information, the multiplicity of subscriber units comprising at least one said symbol-display subscriber unit, said symbol-display subscriber unit comprising:

a receiver receiving the composite signal from the network;

security apparatus in operative engagement with the receiver, the security apparatus receiving each of the plurality of ECMs from the receiver and generating the associated CW from the CW generating information comprised within each said ECM; and a decoder for decoding the encoded broadcast signal for display on a display device, the decoder receiving the encoded broadcast signal from the receiver and receiving the CW from the security apparatus, wherein the security apparatus supplies symbol display information to the decoder, and the decoder provides a symbol to the display device for display thereon, the symbol being based, at least in part, on the symbol display information.

2. A broadcast system comprising:

a headend, a network operative to transmit signals from the headend to a multiplicity of subscriber units comprising at least one symbol-display subscriber unit, said symbol-display subscriber unit comprising:

a receiver receiving from the network a composite signal comprising:

an encoded broadcast signal encoded in accordance with plurality of control words (CWs); and a plurality of encryption control messages (ECMs), each of the plurality of ECMs being associated respectively with one of the plurality of CWs and comprising CW generating information for generating the associated CW;

security apparatus in operative engagement with the receiver, the security apparatus receiving each of the plurality of ECMs from the receiver and generating the associated CW from the CW generating information comprised within said ECM; and a decoder for decoding the encoded signal for display on a display device, the decoder receiving the encoded signal from the receiver and receiving the CW from the security apparatus, wherein the security apparatus supplies symbol display information to the decoder, and the decoder provides a symbol to the display device for display thereon, the symbol being based, at least in part, on the symbol display information.

3. Apparatus according to either claim 1 or claim 2 and wherein the security apparatus comprises removable security apparatus in removable operative engagement with the receiver.

4. Apparatus according to claim 3 and wherein the removable security apparatus comprises a smart card.

5. Security apparatus for use with a symbol-display subscriber unit of a broadcast system, the broadcast system comprising a headend and a network operative to transmit signals from the headend to a multiplicity of subscriber units comprising at least one said symbol-display subscriber unit, said symbol-display subscriber unit comprising a receiver receiving from the network a composite signal comprising an encoded broadcast signal encoded in accordance with a plurality of control words (CWs) and a plurality of encryption control messages (ECMs), each of the plurality of ECMs being associated respectively with one of the plurality of CWs and comprising CW generating information for generating the associated CWs, the security apparatus being operatively engageable with the receiver and with a decoder operative to decode encoded signals using at least one CW and to provide a symbol to a display device based on symbol display information, the security apparatus comprising:

a CW generation unit receiving each of the plurality of ECMs from the receiver and generating the associated CW from the CW generating information comprised within said ECM; and a symbol display information unit for supplying the symbol display information to the decoder.

6. Apparatus according to any of the above claims and wherein said security apparatus comprises a symbol display information storage area for storing said symbol display information.

7. Apparatus according to any of the above claims and wherein at least one of the plurality of ECMs comprises said symbol display information.

8. Apparatus according to any of the preceding claims and wherein said CW comprises said symbol display information.

9. Apparatus according to any of the preceding claims and wherein said CW generating information comprises a seed to a generating function for generating a CW.

10. Apparatus according to any of the preceding claims and wherein said symbol is based, at least in part, on symbol display information comprised within at least two ECMs.

11. Apparatus according to any of the preceding claims and wherein said symbol display information comprises a representation of said symbol.

12. Apparatus according to any of the preceding claims and wherein said symbol display information comprises generating information for generating said symbol.

13. Apparatus according to any of the preceding claims and wherein at least one of said plurality of ECMs comprises control information for controlling display of said symbol.

14. Apparatus according to any of the preceding claims and wherein said symbol display information comprises symbol display instructions, and said decoder executes the symbol display instructions.

15. Apparatus according to any of the preceding claims and wherein said decoder is operative to decode the encoded broadcast signal based, at least in part, on the symbol display information.

16. Apparatus according to any of the preceding claims and wherein the symbol comprises a trademark.

17. Apparatus according to any of the preceding claims and wherein the broadcast system comprises a television broadcast system, and the network comprises a television network, and the encoded broadcast signal comprises an encoded television signal.

18. Encoded information comprising symbol display information, wherein the symbol display information includes information for decoding the encoded information.

19. A method for producing a symbol, the method comprising:

decoding encoded information based, at least in part, on symbol display information; and producing a symbol based, at least in part, on the symbol display information.

20. A method according to claim 19 and wherein the encoded information comprises an encoded transmission.

21. A method according to either claim 19 or claim 20 also comprising:

displaying the symbol on a display.

22. A method according to either claim 19 or claim 20 and also comprising:

presenting the symbol on a virtual reality device.

23. A method according to either claim 19 or claim 20 and also comprising:

presenting the symbol in a manner which is sensible to at least one human sense.

24. A method according to any of claims 19–23 and also comprising:

retrieving the symbol display information from a symbol display information storage area.

25. A method according to any of claims 19–24 and also comprising:

receiving an encryption control message (ECM) comprising the symbol display information.

26. A method for decoding encoded information, the method comprising:

receiving the encoded information; and decoding the encoded information based, at least in part, on symbol display information.

27. A method according to claim 26 and wherein the encoded information comprises an encoded transmission.

28. A method according to either claim 26 or claim 27 and wherein the encoded information comprises the symbol display information.

29. A method according to any of claims 26–28 and also comprising:

receiving decoding information, wherein the decoding information comprises the symbol display information.

30. A method for displaying a symbol on a display within a television system, the method comprising:

transmitting an encoded television signal;

transmitting a plurality of encryption control messages (ECMs) each comprising CW generating information for computing a control word (CW) for decrypting said encoded television signal, at least one of said plurality of ECMs also comprising symbol display information;

computing said CW from said CW generating information; and sending said CW and said symbol display information to a decoder.

31. A symbol-display decoding unit for use with encoded information, the encoded information comprising an encoded information signal encoded in accordance with a plurality of control words (CWs) and a plurality of encryption control messages (ECMs), each of the plurality of ECMs being associated respectively with one of the plurality of CWs and comprising CW generating information, said symbol-display decoding unit comprising:

receiving apparatus for receiving the encoded information;

security apparatus in operative engagement with the receiving apparatus, the security apparatus receiving each of the plurality of ECMs from the receiving apparatus and generating the associated CW from the CW generating information comprised within each said ECM, and a decoder for decoding the encoded information signal, the decoder receiving the encoded information signal from the receiver and receiving the CW from the security apparatus, wherein the security apparatus supplies symbol display information to the decoder, and the decoder provides a symbol in a format suitable for further processing, the symbol being based, at least in part, on the symbol display information.

32. Apparatus according to claim 31 and also comprising:

data playback apparatus for supplying the encoded information to the receiving apparatus.

33. Apparatus according to either claim 31 or claim 32 and also comprising:

virtual reality apparatus for receiving the symbol from the decoder and for providing a virtual reality display of the symbol.

34. Apparatus according to any of claims 31–33 and wherein the security apparatus is adapted to receive at least one conditional access (CA) module, the at least one CA module being operative to:

receive each of the plurality of ECMs from the security apparatus;

generate the associated CW from the CW generating information comprised within each said ECM; and supply the symbol display information to the security apparatus.

35. Apparatus according to claim 34 and wherein the at least one CA module comprises a plurality of CA modules.

36. Apparatus according to claim 35 and wherein only one of the plurality of CA modules provides the symbol display information for each of the plurality of ECMs.

37. Apparatus according to claim 35 and wherein more than one of the plurality of CA modules provides the symbol display information for at least one of the plurality of ECMs.

38. A symbol-display decoding method for use with encoded information, the encoded information comprising an encoded information signal encoded in accordance with plurality of control words (CWs) and a plurality of encryption control messages (ECMs), each of the plurality of ECMs being associated respectively with one of the plurality of CWs and comprising CW generating information, said method comprising:

receiving the encoded information;

receiving each of the plurality of ECMs and generating the associated CW from the CW generating information comprised within each said ECM; and decoding the encoded information signal, the decoding step comprising:

receiving the encoded information signal from the receiver; and receiving the CW from the security apparatus; and supplying symbol display information for providing a symbol in a format suitable for further processing, the symbol being based, at least in part, on the symbol display information.

* * * * *

UNITED STATES PATENT AND TRADEMARK OFFICE
CERTIFICATE OF CORRECTION

| | | |
|---|---|---|
| PATENT NO. | : 6,499,103 B1 | Page 1 of 1 |
| APPLICATION NO. | : 09/341075 | |
| DATED | : December 24, 2002 | |
| INVENTOR(S) | : Yossef Tsuria et al. | |

It is certified that error appears in the above-identified patent and that said Letters Patent is hereby corrected as shown below:

In each of claims 6 and 7, Col. 16, lines 5 and 9: change "any of the above claims" to -- claim 1 --.

In each of claims 8-17, Col. 16, lines 12-40: change "any of the preceding claims" to -- claim 1 --.

Col. 17, line 1, claim 24, change "any of claims 19-23" to -- claim 19 --.

Col. 17, line 5, claim 25, change "any of claims 19-24" to -- claim 19 --.

Col. 17, line 19, claim 29, change "any of claims 26-28" to -- claim 26 --.

Col. 18, line 14, claim 34, change "any of claims 31-33" to -- claim 31 --.

Signed and Sealed this
Thirty-first Day of January, 2012

David J. Kappos
*Director of the United States Patent and Trademark Office*